United States Patent
Hoffman et al.

(10) Patent No.: US 9,605,853 B2
(45) Date of Patent: Mar. 28, 2017

(54) HOME APPLIANCE WITH IMPROVED OVEN RACK

(71) Applicant: BSH Home Appliances Corporation, Irvine, CA (US)

(72) Inventors: Jennifer A. Hoffman, Knoxville, TN (US); Rose Marie Parker, Caryville, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 997 days.

(21) Appl. No.: 13/761,229

(22) Filed: Feb. 7, 2013

(65) Prior Publication Data

US 2014/0216438 A1     Aug. 7, 2014

(51) Int. Cl.
| | |
|---|---|
| *F24C 15/16* | (2006.01) |
| *A47J 36/34* | (2006.01) |
| *A47J 37/06* | (2006.01) |
| *A21B 1/50* | (2006.01) |
| *A21B 3/15* | (2006.01) |
| *A47J 33/00* | (2006.01) |

(52) U.S. Cl.
CPC ............. *F24C 15/168* (2013.01); *A47J 36/34* (2013.01); *A47J 37/0694* (2013.01); *F24C 15/16* (2013.01); *A21B 1/50* (2013.01); *A21B 3/155* (2013.01); *A47J 33/00* (2013.01)

(58) Field of Classification Search
CPC ......... F24C 15/168; F24C 15/16; A47J 33/00; A47J 37/0694; A47J 2037/0795; A47J 36/34; A21B 3/155; A21B 1/50
USPC ...... 126/339, 273 R, 337 R, 167, 152 B, 29, 126/9 B, 59; 211/90.01, 90.02, 90.03, 211/153, 181.1, 187

IPC ................. F24C 15/16; A21B 1/50,3/15; A47J 36/34
See application file for complete search history.

(56) References Cited

U.S. PATENT DOCUMENTS

| | | | | |
|---|---|---|---|---|
| 842,695 | A | * | 1/1907 | Peters ...................... A47J 33/00 126/30 |
| 1,832,518 | A | * | 11/1931 | Wettlaufer ............ B07B 1/4645 209/401 |

(Continued)

FOREIGN PATENT DOCUMENTS

| | | | | |
|---|---|---|---|---|
| DE | 102011116640 A1 | * | 4/2013 | .............. A47J 37/06 |
| DE | EP 2316315 B1 | * | 9/2013 | .......... A47J 37/0694 |

(Continued)

OTHER PUBLICATIONS

"KR_20100084384_A_M—Machine Translation.pdf", KIPO / Korean Patent Information Online Network, Jul. 13, 2016.*

*Primary Examiner* — Gregory Huson
*Assistant Examiner* — Daniel E Namay
(74) *Attorney, Agent, or Firm* — Michael E. Tschupp; Andre Pallapies (57) ABSTRACT

A home appliance having an oven rack including an appliance body having a plurality of oven walls defining an oven cavity; an oven rack for removable disposition in the oven cavity, wherein the oven rack includes two flat side panels and a plurality of straight cross members extending laterally therebetween to define a cooking vessel support surface; and a pair of traveling gliders wherein each glider includes a channel configured for receipt of one of the side panels wherein the oven rack can travel in and out of the oven cavity supported at the side panels by the traveling gliders.

28 Claims, 4 Drawing Sheets

(56) References Cited

U.S. PATENT DOCUMENTS

| | | | | |
|---|---|---|---|---|
| 3,224,081 | A * | 12/1965 | Richter | F25D 25/02 |
| | | | | 211/153 |
| 3,637,085 | A * | 1/1972 | Ball | A47B 96/021 |
| | | | | 211/153 |
| 5,555,615 | A * | 9/1996 | Salli | A47B 37/00 |
| | | | | 108/156 |
| 6,321,741 | B1 * | 11/2001 | Thompson | A47J 37/0772 |
| | | | | 126/25 A |
| 6,938,617 | B2 | 9/2005 | Le et al. | |
| 2003/0052073 | A1 * | 3/2003 | Dix | A47B 57/48 |
| | | | | 211/90.02 |
| 2005/0217501 | A1 * | 10/2005 | Babucke | F24C 15/16 |
| | | | | 99/450 |
| 2006/0065265 | A1 | 3/2006 | Erdmann et al. | |
| 2008/0169256 | A1 * | 7/2008 | Shetler | A47B 96/021 |
| | | | | 211/153 |
| 2009/0200906 | A1 | 8/2009 | Dao | |
| 2010/0218755 | A1 * | 9/2010 | Stewart | F24C 15/168 |
| | | | | 126/339 |
| 2012/0017885 | A1 | 1/2012 | Stewart et al. | |
| 2013/0118471 | A1 * | 5/2013 | Sprigler | F24C 15/168 |
| | | | | 126/19 R |
| 2014/0137856 | A1 * | 5/2014 | Elkasevic | F24C 15/168 |
| | | | | 126/339 |

FOREIGN PATENT DOCUMENTS

| | | | | |
|---|---|---|---|---|
| FR | 2750026 A1 * | 12/1997 | | A47J 37/049 |
| GB | 329773 A * | 5/1930 | | F24C 15/16 |
| GB | 350175 A * | 6/1931 | | F24C 15/16 |
| KR | 20090102444 A | 9/2009 | | |
| KR | 20100084384 A | 7/2010 | | |

* cited by examiner

HOME APPLIANCE WITH IMPROVED OVEN RACK

BACKGROUND OF THE INVENTION

The present invention relates broadly to home appliances for cooking and, more particularly, to a cooking appliance, such as a range or built-in oven having an oven cavity with an improved oven rack and an improved oven rack assembly. The present invention also relates to steamer compartments in such ranges and ovens having an improved oven rack.

Ovens, including steam ovens, usually feature a generally planar rack to serve as a support surface for cooking vessels. Such an oven rack can include a wire grid to define a cooking vessel support surface, and may be configured for telescoping movement in and out of an oven cavity.

Some oven racks engage oven walls directly while others use runners or gliders that engage racks or other supports that are mounted to the oven walls. The present invention is directed to an oven rack using gliders for smooth operation, superior extension and overall enhanced performance.

Figure 1:
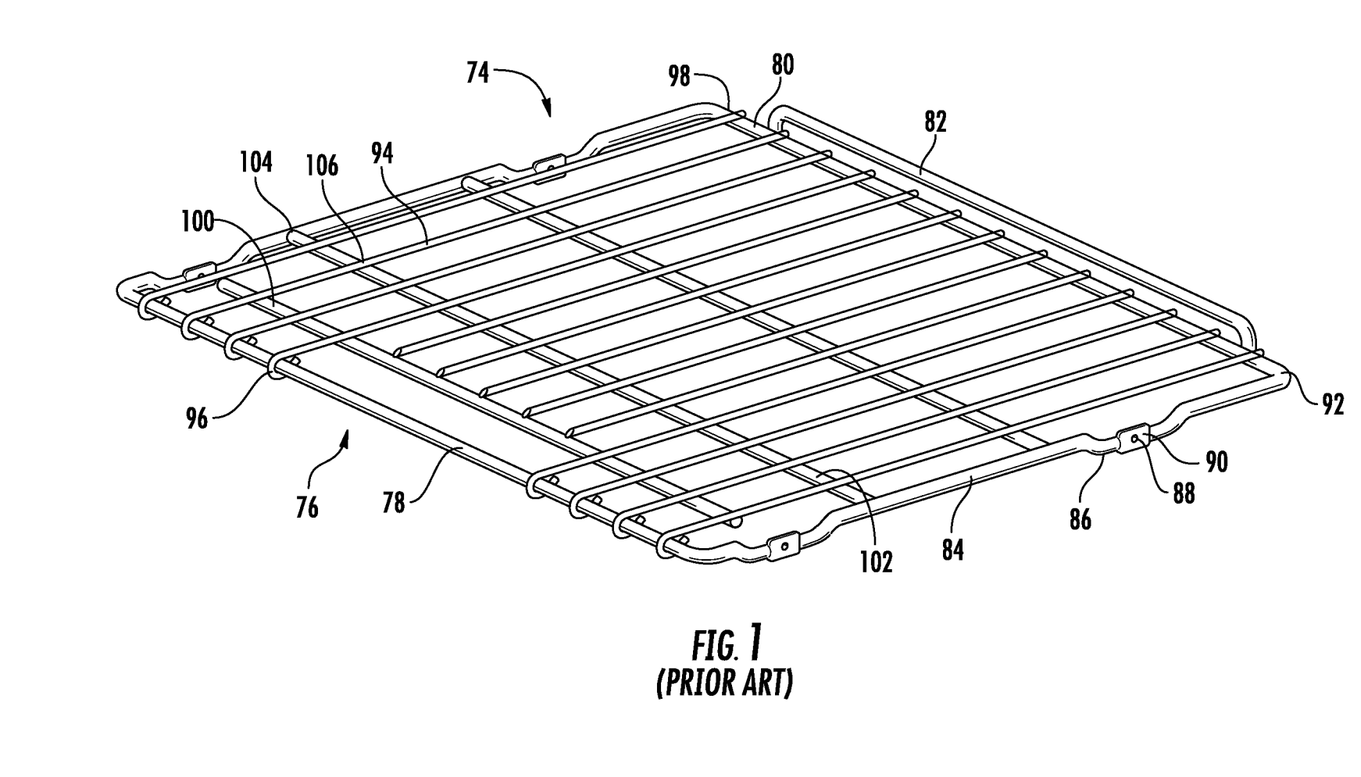
FIG. 1 is front perspective view of an oven rack according to the prior art.

An oven rack according to the prior art is illustrated in FIG. 1 at 74 and includes a continuous perimeter rail 76 including a front lateral rail 78 and a rear lateral rail 80 separated by two side longitudinal rails 84. The front lateral rail 78, the rear lateral rail 80 and the side rails 84 are generally fabricated from a single metal rod resulting in bended corners 92 with rod ends being joined at a weld along the rear lateral rail 80 to generally conceal the joint and to thereby define a continuous perimeter rail 76.

In order to mount the rack 74 in gliders, additional bends are applied to the side longitudinal rails 84 which include a generally U-shaped downward bend 86 which is formed twice on each of the side rails 84, with one downward bend 86 being spaced from the other. The lower surface of each downward bend 86 helps to locate and support the rack 74 in the gliders. A flattened area 90 is formed at approximately the center of the downward bend 86 and includes an opening 88 configured to accommodate a bolt whereby the gliders may be attached to each side longitudinal rail 84 with the bolt extending through the hole 88 with an acorn nut or other type of nut threadedly applied thereto. The perimeter rail 76, four downward bends 86, four flattened areas 90 and four corners 92 are all are labor-intensive to produce.

The cooking vessel support surface is formed by a wire grid within the perimeter rail 76. As with the perimeter rail 76, all rails that form the cooking vessel support grid are configured as generally cylindrical metal rods. Two lateral rails 102 extend between the side rails 84 and each are fixed thereto at a respective welded junction 104. A plurality of longitudinal rails 94 extend between the front lateral rail 78 and the rear lateral rail 80 in a generally spaced, parallel relationship with the side rails 84. The longitudinal rails 94 are each fixed to the rear lateral rail 80 at a respective welded junction 98. The longitudinal rails 94 are fixed to the front lateral rail 78 using a curved hook 96 formed in the end of portion of the longitudinal rail 94 and joined to the front lateral rail 78, each being welded at the hook 96. The hooks 96 act to direct a rough end portion of the longitudinal rail 94 away from user engagement.

The longitudinal rails 94 are spaced across the opening defined by the perimeter rail 76 at regular intervals. The longitudinal rails 94 are each joined to the lateral rails 102 at welds 106 placed at their junctions. A short forward lateral rail 100 extends between some of the longitudinal rails 94 but does not extend to the side longitudinal rails 84. A raised lateral rail 82 is attached to the rear lateral rail 80 and extends substantially parallel therewith along the rear of the rack 74 for handling purposes.

As can be seen from the foregoing, there are numerous bends associated with constructions of the prior rack 74 including the corner bends 92 and the downward bends 86 in the side longitudinal rails 84, each of which adds to the complexity and difficulty of manufacturing such a rack. The flattened portions 90 also add manufacturing complexity and the use of a continuous perimeter rail 76 adds yet another weld along the rear lateral rail 80 to make the perimeter rail 76 a continuous member.

Due to the perimeter rail 76 being fabricated from one rail put through numerous bends and joined end-on-end to form the perimeter rail 76, dimensional stability is an issue because such a perimeter rail may tend to warp and thereby may also put undue strain on the lateral rails 102, the longitudinal rails 94 and their welded junctions. The lack of dimensional stability can make it difficult to mount the rails to the gliders and subsequently to the oven in an effective and efficient manner and can adversely affect operation of the telescoping rack.

Accordingly, there exists a need for and oven rack that provides a simplified construction with fewer manufacturing steps and improved dimensional stability.

SUMMARY OF THE INVENTION

It is accordingly an object to the present invention to provide a home appliance having an oven rack, and an oven rack assembly that eliminates the perimeter rail to provide a reduction in manufacturing steps and expense.

It is another object of the present invention to provide such a home appliance having an oven rack and an oven rack assembly that eliminates bends and flattened areas to also provide a reduction in manufacturing steps and expense.

It is another object to the present invention to provide such a home appliance having an oven rack and an oven rack assembly that provides enhanced dimensional stability due to the elimination of the perimeter rail the associated repeated bends.

To those ends, the present invention is directed to a home appliance having an oven rack including an appliance body having a plurality of oven walls defining an oven cavity and an oven rack for removable disposition in the oven cavity. The oven rack includes two planar side panels and a plurality of straight cross members extending laterally therebetween to define a cooking vessel support surface. The present home appliance also includes pair of traveling gliders wherein each glider includes a channel configured for receipt of one of the side panels wherein the oven rack can travel in and out of the oven cavity supported at the side panels by the traveling gliders.

Preferably, each side panel includes an upstanding body formed as a thin rectangular member having a first side surface and a second side surface separated by a top edge surface, a bottom edge surface, a front end edge surface and a rear end edge surface. It is further preferred that each side panel includes a throughbore in the upstanding body for engagement with a portion of one of the traveling gliders to facilitate mounting the rack to the traveling gliders.

It is preferred that the plurality of cross members includes a straight front cross member extending between the side panels and being attached thereto in a region spaced from the front edge surface of each side panel. Preferably, the plurality of cross members includes a straight rear cross member extending between the side panels and being attached thereto in a region spaced from the rear edge surface of each side panel.

Preferentially, the plurality of cross members includes both a straight front cross member extending between the side panels and being attached thereto in a region spaced from the front edge surface of each side panel and a straight rear cross member extending between the side panels and being attached thereto in a region spaced from the rear edge surface of each side panel.

Preferably, the plurality of cross members includes a plurality of straight intermediate cross members extending between the side panels and being attached thereto in a region intermediate the front cross member and the rear cross member.

In addition, the present invention preferably includes a plurality of longitudinal support members extending longitudinally between the front cross member and the rear cross member intermediate the side panels and in a generally parallel relationship with the side panels, wherein the plurality of longitudinal support members may be spaced from the side panels. It is further preferred that the plurality of longitudinal support members include curved portions extending around the front cross member for attachment thereto.

It is preferred that the plurality of cross members includes a cross member extending laterally between two longitudinal support members and having ends spaced from the side panels.

Preferably, the top edge surface, the bottom edge surface, the front end edge surface and the rear end edge surface are all substantially planar. It is further preferred that each panel body is a substantially planar rectangular sheet of rigid material. It is also preferred that each side panel extends at right angles from each straight cross member.

The present invention is also embodied in a rack assembly for use in an oven. The present rack assembly includes a rack body having two planar side panels and a plurality of straight cross members extending laterally therebetween to define a cooking vessel support surface. The rack assembly of the present invention also includes a pair of traveling gliders wherein each glider includes a channel configured for receipt of one of the side panels whereby the rack body can travel in and out of the oven supported at the side panels by the traveling gliders.

Preferably, each side panel includes an upstanding body formed as a thin rectangular member having a first side surface and a second side surface separated by a top edge surface, a bottom edge surface, a front end edge surface and a rear end edge surface. It is further preferred that each side panel includes a throughbore in the upstanding body for engagement with a portion of one of the traveling gliders to facilitate mounting the rack to the traveling gliders.

It is preferred that the plurality of cross members includes a straight front cross member extending between the side panels and being attached thereto in a region spaced from the front edge surface of each side panel. It is further preferred that the plurality of cross members includes a straight rear cross member extending between the side panels and being attached thereto in a region spaced from the rear edge surface of each side panel.

Preferably, the plurality of cross members includes both a straight front cross member extending between the side panels and being attached thereto in a region spaced from the front edge surface of each side panel and a straight rear cross member extending between the side panels and being attached thereto in a region spaced from the rear edge surface of each side panel.

It is also preferred that the plurality of cross members includes a plurality of straight intermediate cross members extending between the side panels and being attached thereto in a region intermediate the front cross member and the rear cross member.

The present invention further preferably includes a plurality of longitudinal support members extending longitudinally between the front cross member and the rear cross member intermediate and in a generally parallel relationship with the side panels. Preferentially, the plurality of longitudinal support members are spaced from the side panels and the plurality of longitudinal support members may include curved portions extending around the front cross member for attachment thereto.

Preferably, the plurality of cross members includes a cross member extending laterally between two longitudinal support members and having ends spaced from the side panels.

It is preferred that the top edge surface, the bottom edge surface, the front end edge surface and the rear end edge surface are all substantially planar. It is further preferred that each panel body is formed from a substantially planar rectangular sheet of rigid material. It is also preferred that each side panel extends at right angles from each straight cross member.

By the above the present invention provides a home appliance having an improved oven rack and an improved oven rack assembly that is more straightforward to manufacture and is more dimensionally stable, particularly in being resistant to warping, than prior appliances and oven rack assemblies.

DESCRIPTION OF THE PREFERRED EMBODIMENT

Figure 2:
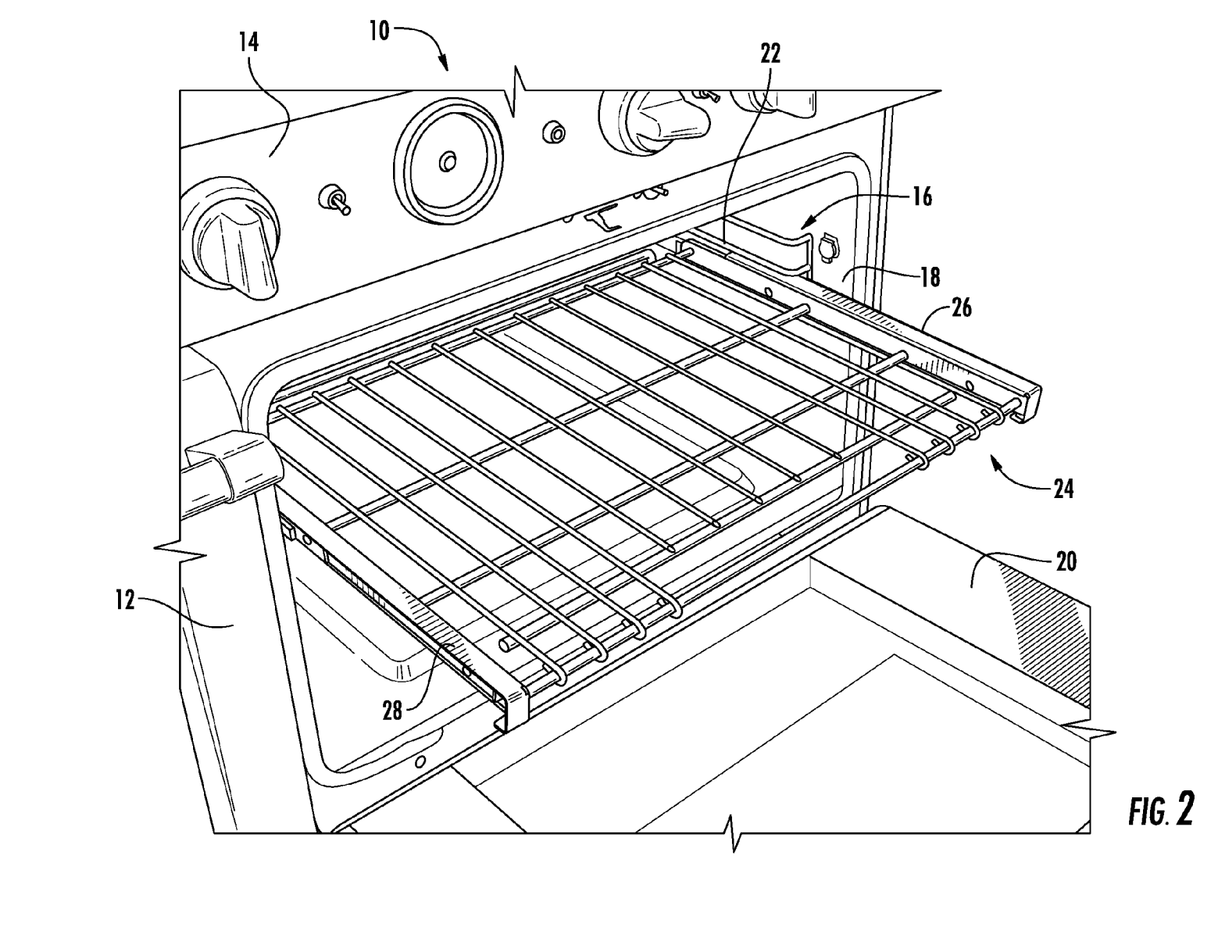
FIG. 2 is a front perspective view of a home appliance in the form of a range having an oven with an improved oven rack according to one preferred embodiment of the present invention.

Turning now to the drawings and, more particularly to FIG. 2, a home appliance in the form of a range having an oven and an improved oven rack according to one preferred embodiment of the present invention is illustrated generally at 10. It will be understood by those skilled in the art that the present oven rack assembly finds use in ranges such as the one illustrated in FIG. 2 and built-in ovens, wherein both ranges and built-in ovens may also include steamers that are essentially ovens configured for cooking with steam.

The range 10 includes a generally rectangular range body 12 that may be a freestanding range or a built-in range. The body 12 includes a control panel 14 mounted thereto. An oven cavity 16 is defined in the range body 12 by a plurality of oven walls 18. An oven access opening in the range body 12 is selectively coverable by an oven door 20. It will be appreciated by those skilled in the art that heating elements (not shown) are operationally associated with the oven for use in cooking.

A rack 24 is provided for supporting cooking vessels in the oven cavity 16 and is configured for telescoping movement in and out of the oven cavity 16. In order to more safely and effectively access any cooking vessels carried on the rack 24, the rack 24 is mounted to and moves with traveling gliders 26, 28 along glider support elements 22 mounted to the oven walls 18. The rack 24 and the gliders 26, 28 form a rack assembly. The rack assembly is also illustrated in FIG. 4.

Figure 4:
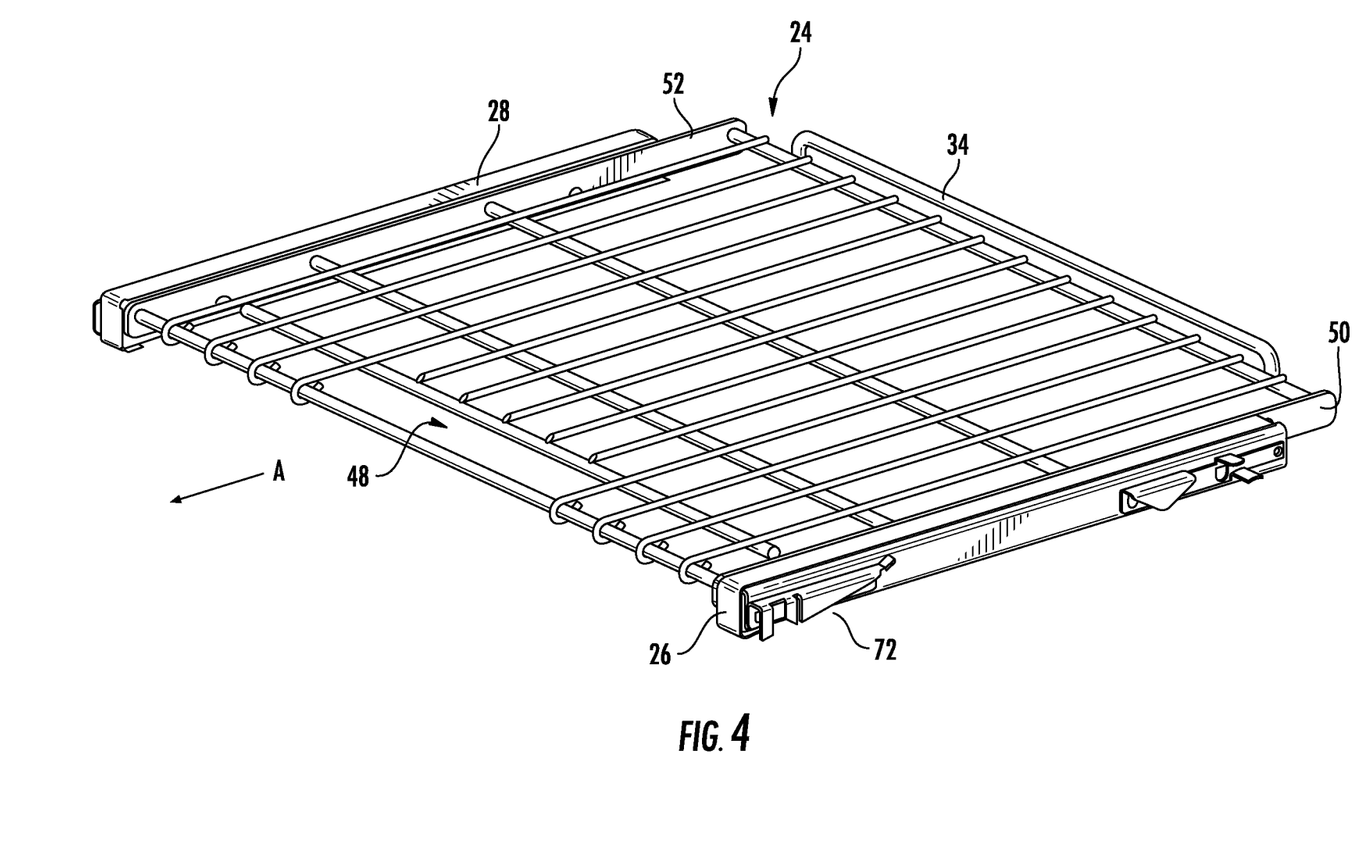
FIG. 4 is a rear perspective view of an improved oven rack assembly according to one preferred embodiment of the present invention.

With reference to FIG. 2 and FIG. 4, the gliders 26, 28 are formed with channels for receiving the side portions of the rack 24 as seen in FIG. 2. The gliders 26, 28 facilitate dependable and stable movement of the rack 24 into and out of the oven cavity 16. The direction of rack 24 movement is indicated by an arrow A in FIG. 4.

In order to provide smooth movement and a rigid surface, the present rack 24 has substantial dimensional stability. A dimensionally stable rack should not warp or otherwise strain to bend which could jeopardize the integrity of its mount or urge the traveling gliders into a bind. During manufacture, such dimensional stability can make certain manufacturing steps more straightforward and efficient.

Figure 3:
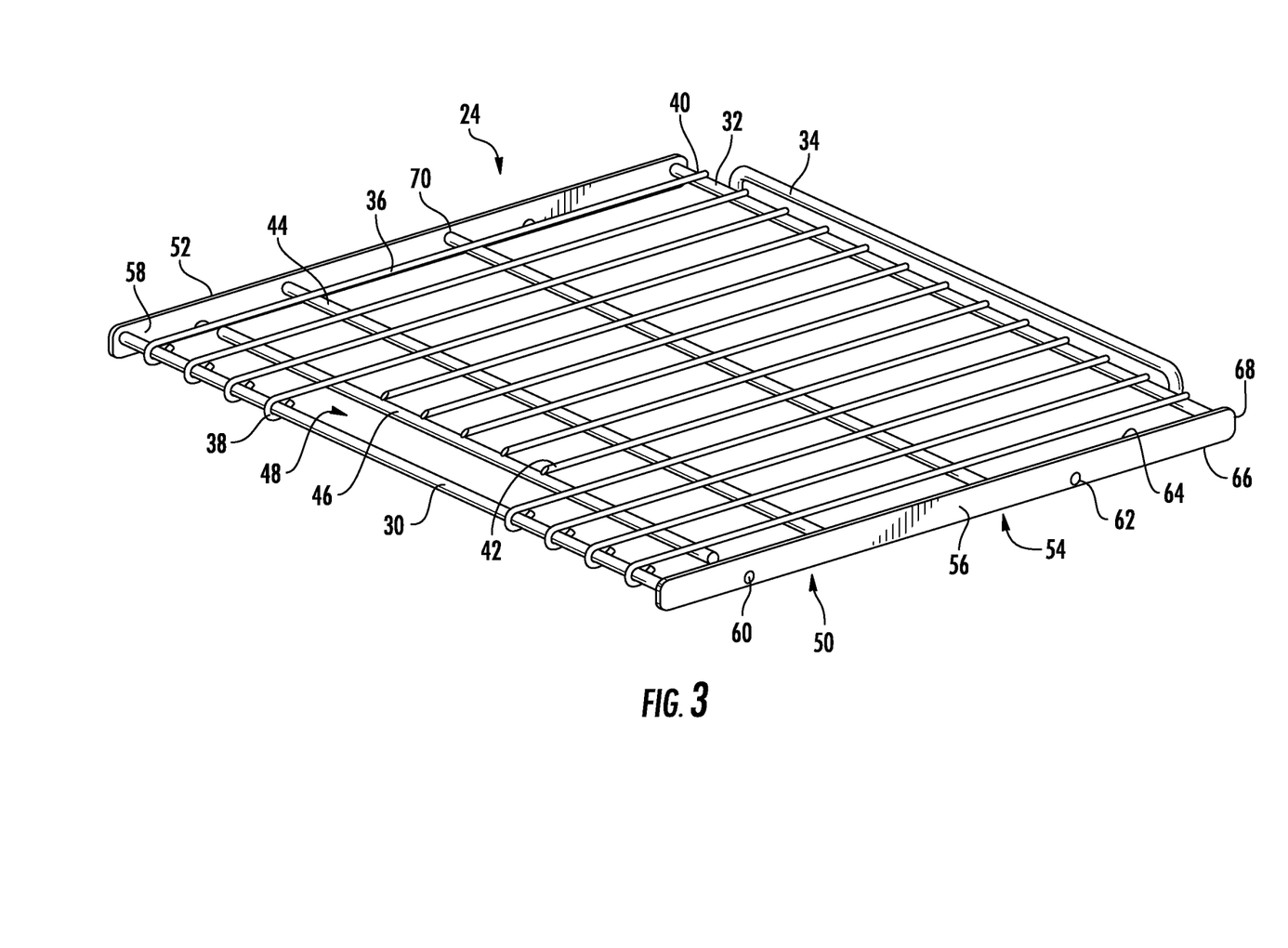
FIG. 3 is a front perspective view of the oven rack illustrated in FIG. 2.

The present rack is illustrated in FIG. 3 without the traveling gliders 26, 28. While the present rack 24 is configured for mating with the same gliders as the prior art rack of FIG. 1, it should be understood that there are no particular requirements of the gliders other than to support the rack 24 in a stable and sufficiently strong manner.

The rack 24 includes a wire grid fabricated from metal rods extending intermediate two planar side panels 50, 52. The wire grid does not include a perimeter rail and includes no significant bends and no wire side rails. Each side panel 50, 52 includes a generally planar rectangular slab-like, upstanding side body 54 that is formed as a generally flat, thin planar member having a flat outer surface 56 and a flat inner surface 58. The side panels 50, 52 are devoid of overhangs, flanges and the like and define the forwardmost and rearwardmost extent of the rack 24.

Throughbores or holes 60, 62 are formed through each side body 54 for accommodating mounting lugs or bolts from the gliders. It should be understood that the holes 60, 62 may be formed through the side panels 50, 52 in whatever configuration or position required to accommodate the glider of choice. Each side panel 50, 52 includes thin edges separating the inner surface 58 and the outer surface 56. The edges include a top edge 64, a bottom edge 66, and two end edges 68.

The cooking vessel support surface grid is fabricated from a plurality of lateral rails including a front lateral rail 30 and a rear lateral rail 32 extending as straight cross members between the side panels 50, 52. Both the front later rail 30 and the rear later rail 32 are fixed to the side panels 50, 52 at each end thereof and spaced slightly inwardly from the end edges 68. A raised rear lateral rail 34 extends from one connection point on the rear lateral rail 32 to another intermediate the two side panels 50, 52 and is spaced inwardly from the junction of the rear lateral rail 32 and the side panels 50, 52. A pair of intermediate lateral rails 44 extend as straight cross members between the side panels, 50, 52. All of the lateral rails 30, 32 44 are fixed to the side panels 50, 52 at respective welds 70. While FIG. 3 illustrates two intermediate lateral rails, there could be more depending on design factors.

A plurality of parallelly extending longitudinal rails 36 are mounted to the front lateral rail 30 and the rear lateral rail 32 to extend therebetween as support members and form a portion of the cooking vessel support surface grid. The longitudinal rails 36 are attached by welds 40 at the rear lateral rail 32 and are fixed to the front lateral rail 30 at respective welds 38. The longitudinal rails 36 are formed with curved hooks to remove any sharp or rough edges from the chance of user contact.

A short intermediate lateral rail 46 extends as a straight cross member between the longitudinal rails 36 but does not engage either side panel 50, 52. Further, short longitudinal rails 42 extend from the short lateral rail 46 to the rear lateral rail 32. The short lateral rails 46 are intermediate two groups of four longitudinal rails 36 that together define a handle space 48 to accommodate access by a user to facilitate manually extending the rack from the oven and inserting the rack into the oven cavity.

FIG. 4 illustrates the rack 24 mounted to the gliders 26, 28 with the side panels 50, 52 mounted to the channels of each glider 26, 28 to form a rack assembly. The mounting is accomplished using the holes in the side panels 50, 52 in conjunction with a nut-and-bolt arrangement associated with the gliders 26, 28. Mounting elements 72 are provided that mount to the glider supports 22, seen in FIG. 2.

By the above, the present invention provides a home appliance and an oven rack assembly that reduces the cost of manufacture and enhances dimensional stability by eliminating repeated bends, welds, flattening steps and the perimeter wire form. The rack assembly of the present invention provides a more simplified construction and effectively enhances manufacturing efficiency while reducing the overall cost of the associated appliance. The rack itself requires less-intensive manufacturing steps and should also provide a lower cost as a spare part.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

What is claimed is:

1. A home appliance having an oven rack comprising:
an appliance body having a plurality of oven walls defining an oven cavity;
an oven rack for removable disposition in the oven cavity, wherein the oven rack includes two planar side panels with each side panel having a uniform height and a uniform width, and a plurality of straight cross members mounted to the side panels and extending laterally therebetween to define a cooking vessel support surface; and
a pair of traveling gliders operatively engaged with two glider support elements mounted to the oven walls, wherein each of the pair of traveling gliders includes a channel, and
wherein each of the two planar side panels is mounted within the channel of each of the pair of traveling gliders such that the oven rack can travel in and out of the oven cavity with the traveling gliders.

2. The home appliance of claim 1, wherein each of the two planar side panel includes an upstanding body formed as a thin rectangular plate member including:
a vertically extending first side surface and a vertically extending second side surface;
a horizontally extending top surface connecting an upper end of the vertically extending first side surface to an upper end of the vertically extending second side surface, wherein the horizontally extending top surface has a first edge that is flush with and conjoined with an upper edge of the vertically extending first side surface, and a second edge that is flush with and conjoined with an upper edge of the vertically extending second side surface;
a horizontally extending bottom surface connecting a lower end of the vertically extending first side surface to a lower end of the vertically extending second side surface, wherein the horizontally extending bottom surface has a first edge that is flush with and conjoined with a lower edge of the vertically extending first side surface, and a second edge that is flush with and conjoined with a lower edge of the vertically extending second side surface;
a vertically extending front end surface connecting the vertically extending first side surface to the vertically extending second side surface; and
a vertically extending rear end surface connecting the vertically extending first side surface to the vertically extending second side surface.

3. The home appliance having an oven rack according to claim 2 wherein each side panel includes a throughbore in the upstanding body for engagement with a portion of one of the traveling gliders to facilitate mounting the rack to the traveling gliders.

4. The home appliance having an oven rack according to claim 2 wherein the top surface, the bottom surface, the front end surface and the rear end surface are all substantially planar.

5. The home appliance having an oven rack according to claim 1 wherein the plurality of cross members includes a straight front cross member extending between the side panels and being attached thereto in a region spaced from the front edge surface of each side panel.

6. The home appliance having an oven rack according to claim 1 wherein the plurality of cross members includes a straight rear cross member extending between the side panels and being attached thereto in a region spaced from the rear edge surface of each side panel.

7. The home appliance having an oven rack according to claim 1 wherein the plurality of cross members includes a straight front cross member extending between the side panels and being attached thereto in a region spaced from the front edge surface of each side panel and a straight rear cross member extending between the side panels and being attached thereto in a region spaced from the rear edge surface of each side panel.

8. The home appliance having an oven rack according to claim 7 wherein the plurality of cross members includes a plurality of straight intermediate cross members extending between the side panels and being attached thereto in a region intermediate the front cross member and the rear cross member.

9. The home appliance having an oven rack according to claim 7 and further comprising a plurality of longitudinal support members extending longitudinally between the front cross member and the rear cross member intermediate the side panels and in a generally parallel relationship with the side panels.

10. The home appliance having an oven rack according to claim 9 wherein the plurality of longitudinal support members are spaced from the side panels.

11. The home appliance having an oven rack according to claim 9 wherein the plurality of longitudinal support members include curved portions extending around the front cross member for attachment thereto.

12. The home appliance having an oven rack according to claim 9 wherein the plurality of cross members includes a cross member extending laterally between two longitudinal support members and having ends spaced from the side panels.

13. The home appliance having an oven rack according to claim 1 wherein each panel body is a substantially planar rectangular sheet of rigid material.

14. The home appliance having an oven rack according to claim 1 wherein each side panel extends at right angles from each straight cross member.

15. A rack assembly for use in an oven, the rack comprising:
a rack body having two planar side panels with each side panel having a uniform vertically extending height and a uniform horizontally extending width and a plurality of straight cross members mounted to the side panels and extending laterally therebetween to define a cooking vessel support surface; and
a pair of traveling gliders operatively engaged with two glider support elements mounted to walls of the oven, wherein each of the pair of traveling gliders includes a channel, and
wherein each of the two planar side panels is mounted within the channel of each of the pair of traveling gliders such that the oven rack can travel in and out of the oven cavity with the traveling gliders.

16. The rack assembly according to claim 15, wherein each of the two planar side panels includes an upstanding body formed as a thin rectangular plate member including:
a vertically extending first side surface and a vertically extending second side surface;
a horizontally extending top surface connecting an upper end of the vertically extending first side surface to an upper end of the vertically extending second side surface, wherein the horizontally extending top surface has a first edge that is flush with and conjoined with an upper edge of the vertically extending first side surface, and a second edge that is flush with and conjoined with an upper edge of the vertically extending second side surface;
a horizontally extending bottom surface connecting a lower end of the vertically extending first side surface to a lower end of the vertically extending second side surface, wherein the horizontally extending bottom surface has a first edge that is flush with and conjoined with a lower edge of the vertically extending first side surface, and a second edge that is flush with and conjoined with a lower edge of the vertically extending second side surface;
a vertically extending front end surface connecting the vertically extending first side surface to the vertically extending second side surface; and
a vertically extending rear end surface connecting the vertically extending first side surface to the vertically extending second side surface.

17. The rack assembly according to claim 16 wherein each side panel includes a throughbore in the upstanding body for engagement with a portion of one of the traveling gliders to facilitate mounting the rack to the traveling gliders.

18. The rack assembly according to claim 16 wherein the top surface, the bottom surface, the front end surface and the rear end surface are all substantially planar.

19. The rack assembly according to claim 15 wherein the plurality of cross members includes a straight front cross member extending between the side panels and being attached thereto in a region spaced from the front edge surface of each side panel.

20. The rack assembly according to claim 15 wherein the plurality of cross members includes a straight rear cross member extending between the side panels and being attached thereto in a region spaced from the rear edge surface of each side panel.

21. The rack assembly according to claim 15 wherein the plurality of cross members includes a straight front cross member extending between the side panels and being attached thereto in a region spaced from the front edge surface of each side panel and a straight rear cross member extending between the side panels and being attached thereto in a region spaced from the rear edge surface of each side panel.

22. The rack assembly according to claim 21 wherein the plurality of cross members includes a plurality of straight intermediate cross members extending between the side panels and being attached thereto in a region intermediate the front cross member and the rear cross member.

23. The rack assembly according to claim 21 and further comprising a plurality of longitudinal support members extending longitudinally between the front cross member and the rear cross member intermediate and in a generally parallel relationship with the side panels.

24. The rack assembly according to claim 23 wherein the plurality of longitudinal support members are spaced from the side panels.

25. The rack assembly according to claim 23 wherein the plurality of longitudinal support members include curved portions extending around the front cross member for attachment thereto.

26. The rack assembly according to claim 23 wherein the plurality of cross members includes a cross member extending laterally between two longitudinal support members and having ends spaced from the side panels.

27. The rack assembly according to claim 15 wherein each panel body is formed from a substantially planar rectangular sheet of rigid material.

28. The rack assembly according to claim 15 wherein each side panel extends at right angles from each straight cross member.

* * * * *